(12) United States Patent
Hudman et al.

(10) Patent No.: US 6,909,280 B1
(45) Date of Patent: Jun. 21, 2005

(54) INDUCTIVE POSITION DETECTOR (75) Inventors: Frederick Mark Hudman, Coalville (GB); Geoffrey Glasgow, Coalville (GB); Ewan Lee, Stoney Stanton (GB)

(73) Assignee: Elliott Industries Limited, London (GB)

( * ) Notice: Subject to any disclaimer, the term of this patent is extended or adjusted under 35 U.S.C. 154(b) by 113 days.

(21) Appl. No.: 10/129,565

(22) PCT Filed: Nov. 6, 2000

(86) PCT No.: PCT/GB00/04248
§ 371 (c)(1),
(2), (4) Date: Sep. 30, 2002

(87) PCT Pub. No.: WO01/33171
PCT Pub. Date: May 10, 2001

(30) Foreign Application Priority Data

Nov. 4, 1999 (GB) .............................................. 9926153

(51) Int. Cl.⁷ .............................. G01B 7/14; G01D 5/20
(52) U.S. Cl. ................................................. 324/207.17
(58) Field of Search ....................... 324/207.11–207.17, 324/202, 207.24

(56) References Cited

U.S. PATENT DOCUMENTS 4,103,222 A * 7/1978 Phillips et al. ......... 324/207.17
6,549,004 B1 * 4/2003 Prigge ................... 324/207.17

FOREIGN PATENT DOCUMENTS

| EP | 0 386 477 A2 | 9/1990 |
| EP | 0 743 508 A2 | 11/1996 |
| EP | 0 795 738 A1 | 9/1997 |
| GB | 1 513 567 | 6/1978 |
| GB | 2 286 679 A | 8/1995 |
| JP | 11-223505 | 8/1999 |

OTHER PUBLICATIONS

Copy of GB Search Report Cover Page (1 sheet) dated Mar. 15, 2000, GB 9926153.9.

* cited by examiner

Primary Examiner—N. Le
Assistant Examiner—Reena Aurora
(74) Attorney, Agent, or Firm—Kilyk & Bowersox, P.L.L.C.

(57) ABSTRACT

The invention relates to an inductive position detector (1) comprising a first member (9) having a longitudinal axis and an element of magnetic material extending in the direction of the longitudinal axis and having a periodically varying dimension in a direction perpendicular to the longitudinal axis, and a second member (10) movable relatively to the first member along the longitudinal axis and comprising means to induce a magnetic field in the element. The position detector analyses characteristic variations in the magnetic field to determine the position of the first member relative to the second member.

28 Claims, 5 Drawing Sheets

PRIOR ART

INDUCTIVE POSITION DETECTOR

BACKGROUND

In modern production machinery, such as machine tools, it is necessary to have precise position detectors for accurately measuring and producing large parts. Often, such machinery are large and bulky, and require the use of long and precise position detectors which are difficult to manufacture and mount accurately. These position detectors are usually mounted to two members of the machine tool and provide information on the displacement between the two members. The present invention relates to improvements to a position detector used for measuring the relative displacement between two members.

Various arrangements have been used in the art for providing positional information, for example, by providing an electrical signal which varies with displacement. Such an arrangement is disclosed in GB 1513567, wherein a first member carrying a row of balls moves relative to a second member carrying electromagnetic induction coils and pick-up coils. A magnetic field is induced along the line of contact of the balls by the induction coils and the signal output from the pick-up coils depends on the position of the balls. Relative displacement between the first and second members results in movement of the balls past the pick-up coils, thus providing a signal varying with displacement. In such an arrangement, to calculate relative displacement, the number of periods of the signal must be counted.

Although the device disclosed in GB 1513567 has been commercially successful, it has limited resolution, and is incapable of automatic calibration or self-diagnosis. In addition, this prior art position detector generates non-standard signals which require equipment designed by the original manufacturer of the detectors, commonly known as OEM, to decode the signals, and thus provide the positional information.

Prior art devices, such as that in GB 1513567, are manually calibrated by a skilled operator. Generally, following manufacture and assembly of the device and prior to use in service, the accuracy of the device is compared against a standard device and adjusted to minimise deviations. This adjustment is done using manual potentiometers within the device.

Once in service, re-calibration is awkward. In addition, the devices are not able to adjust themselves to take account of fluctuations in signalling due to, for example, changes in ambient temperature, operational frequency, or even in the properties of the components of the device over time. Although these fluctuations may be relatively small, they do affect the accuracy of the device. A further drawback of prior art devices is that they provide no immediate indication that the device requires re-calibration, which is particularly important for small but significant deviations.

The frequency of operation determines the resolution of the prior art devices. These devices are generally operated at a relatively low frequency of 1 kHz (1000 cycles per second). Although the devices can be operated at higher frequencies and could provide higher resolutions, they would require higher frequency clocks which are more expensive. In addition, higher operational frequencies lead to a change in the magnetic properties of the system, which in turn would, without correction, lead to increased errors in measurement of position.

Furthermore, the interpolation of the signalling to provide positional information can only occur once a cycle in the prior art devices. This is because the prior art devices operate by comparing the phase shift between the drive and return signals, which is most conveniently done by comparing the zero amplitude in the signalling. As the interpolation can only occur once a cycle, for the size of balls and frequency of operation which are commonly used, the prior art devices are limited to approximately 2.5 $\mu$m resolution. However, improvements in the speed of operation of production machinery means that, in certain cases, this resolution is not adequate. Accurate resolution of the order of 1 $\mu$m and less is required.

SUMMARY

Accordingly, the present invention provides a position detector comprising a first member, a second member, a transducer, at least one analogue to digital signal converter, and at least one digital signal processor, wherein:

the first member carries a train of elements of magnetic material disposed side by side in a row having a central axis in contact with one another and constrained against movement relative to one another, wherein the train has a varying dimension in a direction perpendicular to the central axis;

the first and second members are relatively movable in a direction parallel to the central axis;

the second member carries the transducer;

the transducer comprises transmitting and sensing means, the transmitting means arranged to produce a magnetic field through the train of elements, and the sensing means comprising at least one pick-up coil which is disposed adjacent to the train of elements, and which is arranged to detect variations in the magnetic field which are produced during relative movement between the first and second members as a result of the variation in distance between the pick-up coils and the edge of the train of elements nearest the pick-up coils, whereby the or each pick-up coil provides an analogue signal, the amplitude of which is characteristic of the relative position of the first and second members;

the or each analogue to digital signal converter is arranged to receive an analogue signal derived from the at least one pick-up coil and to convert it to a digital signal;

and the or each digital signal processor is arranged to receive the digital signals from the or each analogue to digital converter, and is operable, at pre-determined sampling intervals, to sample the digital signals and to determine the position of the first member relative to the second member using the characteristic variation of signal amplitude with respect to the relative position of the first and second members.

Preferably, the dimension of the train perpendicular to the central axis varies in a repeated pattern along the train.

The digital signal processor may also sample the signals at regular pre-determined intervals.

The digital signal processor may be arranged to compare features of the variation of signal amplitude with respect to position of the signals from a first set of pick-up coils, to features of the variation of signal amplitude with respect to position from a second set of pick-up coils, and to adjust the amplitude features to produce signals from the first and second set of coils with substantially equal amplitudes features.

Preferably, the transmitting means is arranged to produce a periodically varying magnetic field with respect to time. In this preferred embodiment, the digital signal processor is arranged to sample the signals from the pick-up coils substantially near their peak amplitudes with respect to time.

Alternatively, the digital signal processor may be arranged to monitor and adjust the sampling of the signals to substantially near the peak amplitudes of the signals with respect to time.

In a preferred embodiment, the train of elements comprises a plurality of substantially spherical, identical balls of magnetic material disposed side by side in point contact, the first and second members are relatively movable in a direction parallel to the line of point contact between the balls, the sensing means comprises at least two pick-up coils which are disposed adjacent to and spaced along the train of elements, and the digital signal processor is arranged to determine the position of the first member relative to the second member by using a mathematical calculation comprising an arctangent value of a ratio of the amplitude of a sampled first digital signal from at least one pick-up coil and the amplitude of a sampled second digital signal from at least one other pick-up coil, the relative amplitude and the corresponding positions of the signals above or below an axis about which the signals fluctuate, and a constant, the constant determined from a peak amplitude of the signals with respect to position, and a ball dimension.

Preferably, in this embodiment the peak amplitude of the signals with respect to position is determined from calibration set values. Alternatively, the peak amplitude of the signals with respect to position used in the constant of the mathematical calculation is determined from sampling the peak amplitude of the signals with respect to position over a period of time during service.

Advantageously, in this preferred embodiment the digital signal processor is arranged to compare the amplitude of the signals with respect to position above an axis about which the signal fluctuates, to the amplitude of the corresponding signal below the axis, and to adjust the amplitudes of the signals to produce symmetrical signals with substantially equal amplitudes above and below the axis.

Preferably, the transducer comprises:

at least one set of four pick-up coils which are disposed adjacent to and spaced along the row of balls;

wherein the digital signal processor is arranged to measure the imbalances in the first/third and second/fourth pair of signals, and to adjust the signals to reduce the imbalance between the respective pair of signals.

Alternatively, the transducer comprises:

at least one set of four pick-up coils which are disposed adjacent to and spaced along the row of balls;

and at least one imbalance circuit for each pair of first/third and second/fourth pick-up coils in the set, the imbalance circuit arranged to receive the signals from the pick-up coils, and comprising a potentiometer arranged to receive and adjust analogue signals from the pick-up coils, and a subtracting circuit;

wherein the first pick-up coil of the set is arranged to receive a signal of lower amplitude than the third pick-up coil of the set, and the fourth pick-up coil of the set is arranged to receive a signal of lower amplitude than the second pick-up coil of the set, and the potentiometer for the first/third pair of pick-up coils is operable to increase the amplitude of the first pick-up coil signal by adding a proportion of the amplitude of the first pick-up coil signal, and the subtracting circuit is operable to subtract the amplitude of the third pick-up coil signal to provide the first signal used in the mathematical calculation, and the potentiometer for the fourth/second pair of pick-up coils is operable to increase the amplitude of the fourth pick-up coil signal by adding a proportion of the amplitude of the fourth pick-up coil signal, and the subtracting circuit is operable to subtract the amplitude of the second pick-up coil signal to provide the second signal used in the mathematical calculation.

The invention also provides a method of determining the displacement of the first member relative to the second member of the position detector described previously, comprising sampling the digital signals and using the characteristic variation of signal amplitude with respect to the relative position of the first and second members to determine the relative position of the first and second members.

Preferably, the method comprises comparing features of the variation of signal amplitude with respect to position of the signals from a first set of pick-up coils, to features of the variation of signal amplitude with respect to position from a second set of pick-up coils, and adjusting the amplitude features to produce signals from the first and second set of coils with substantially equal amplitudes features.

In the preferred embodiment in which the train comprises a plurality of spherical balls, the method comprises sampling the signals from the pick-up coils of the transducer at pre-determined intervals, calculating the arctangent value of a ratio of the amplitude of a first sampled signal from the transducer to the amplitude of a second sampled signal from the transducer, determining the relative amplitude of each of the sampled signals and their corresponding position above or below a axis about which they fluctuate, and performing a mathematical calculation to determine the relative displacement of the first member to the second member by using the arctangent value of the amplitude of the sampled signals, the relative amplitude and their positions about the axis, and a constant, the constant being determined from the peak amplitude of the signals with respect to position and also a ball dimension.

Preferably, in this embodiment the peak amplitude of the signals with respect to position is determined from calibration set values. Alternatively, the peak amplitude of the signals with respect to position used in the constant of the mathematical calculation is determined from sampling the peak amplitude of the signals with respect to position over a period of time during service.

Advantageously, in this preferred embodiment the amplitude of the signals with respect to position above an axis about which the signal fluctuates, is compared to the amplitude of the corresponding signal below the axis, and adjusted to produce symmetrical signals with substantially equal amplitudes above and below the axis.

In the preferred embodiment in which the transmitting means is arranged to produce a periodically varying magnetic field with respect to time, the method comprises sampling the signals from the pick-up coils substantially near their peak amplitudes with respect to time. Alternatively, sampling of signals may be monitored and adjusted to sample substantially near the peak amplitudes of the signals with respect to time.

In the preferred embodiment comprising at least one set of four pick-up coils which are disposed adjacent to and spaced along the row of balls, the method comprises measuring the imbalances in the first/third and second/fourth pair of signals, and reducing the imbalance between the respective pair of signals.

Alternatively, the imbalance in the sampled signals is reduced by providing the transducer with at least one set of four pick-up coils which are disposed adjacent to and spaced along the row of balls;

and at least one imbalance circuit for each pair of first/third and second/fourth pick-up coils in the set, the imbalance circuit arranged to receive the signals from the pick-up coils, and comprising a potentiometer arranged to receive and adjust analogue signals from the pick-up coils, and a subtracting circuit;

and comprising the steps of arranging the first pick-up coil of the set to receive a signal of lower amplitude than the third pick-up coil of the set, and arranging the fourth pick-up coil of the set to receive a signal of lower amplitude than the second pick-up coil of the set, increasing the amplitude of the first pick-up coil signal by using the first/third pair potentiometer to add a proportion of the amplitude of the first pick-up coil signal, and using the subtracting circuit to subtract the amplitude of the third pick-up coil signal from the increased first pick-up signal, to provide the first signal used in the mathematical calculation, and increasing the amplitude of the fourth pick-up coil signal by using the fourth/second pair potentiometer to add a proportion of the amplitude of the fourth pick-up coil signal, and using the subtracting circuit to subtract the amplitude of the second pick-up coil signal from the increased fourth pick-up signal, to provide the second signal used in the mathematical calculation.

The present invention recognises that the amplitude of the signals detected by the pick-up coils are dependent upon the distance between the pick-up coils and the edge of a train of magnetic elements nearest the pick-up coils. Therefore, by varying the dimension of the train of elements in a direction perpendicular to their central axis, a characteristic relationship can be determined between the relative position of the pick-up coils and the train and signal amplitude registered by the pick-up coils. Therefore, unlike the prior art, the present invention does not rely on interpolation of electrical signalling, but determines position from a mathematical calculation which defines the characteristic relationship between the amplitude of the signal and relative position of the train and the pick-up coils. Therefore, the invention can provide an accurate resolution of the order of 1 $\mu$pm or less.

Of course, if a current which varies with time (e.g. sinusoidal signal) is used to induce the magnetic field through the train of elements, the amplitude of the signal registered by the pick-up coils is dependent upon when, in time, a sample is taken to determine position. Therefore, there will be a characteristic relationship between position and signal amplitude for each sampling frequency.

The present invention also allows the position detector to perform the conversion of the signals into positional information once or more than once per operating cycle, and thus the resolution of the present invention is not solely dictated by the operational frequency.

In addition, the position detector can be calibrated using a automatic process, without the intervention of a skilled operator, and can also adjust itself to take account of fluctuations in signalling during service. Furthermore, the position detectors of the present invention can provide an indication as to when the device itself cannot perform the in-service re-calibration, and thus human intervention is required.

BRIEF DESCRIPTION OF THE DRAWING

The present invention will now be described in detail with reference to the accompanying drawings in which.

DESCRIPTION OF VARIOUS EMBODIMENTS

Figure 1:
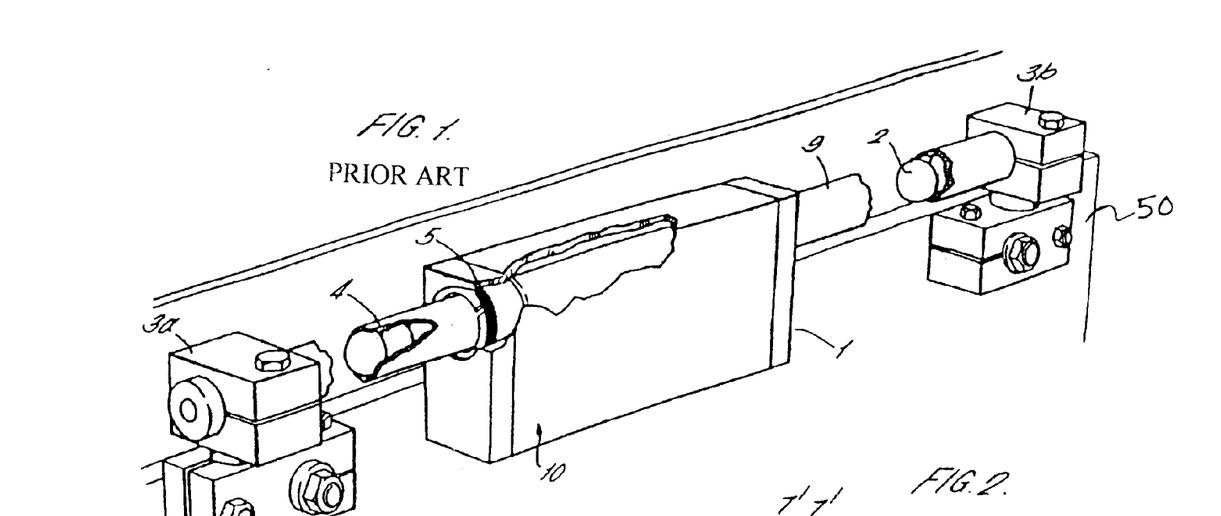
FIG. 1 is a perspective drawing of a displacement or position detector according to the present invention.

FIG. 1 illustrates a detector which is suitable for use with a machine tool to provide a signal which is periodic with displacement, and is of the type disclosed in GB1513567 and is also the subject of the present invention. As can be seen the device or detector 1 comprises a scale 9 and a housing 10. The scale 9 is fixedly mounted (directly or indirectly) to a first member 50 of the machine tool whilst the housing 10 is fixedly mounted (directly or indirectly) to a second member (not shown) of the machine tool. The detector 1 measures the relative displacement between these two members. As an example, the first member can be part of a machine tool whilst the second member can be the work-piece being machined.

In this arrangement, the scale 9 is formed from a tube 4 of non-magnetic material with magnetic balls 2 linearly arranged therewithin. The scale 9 is held by scale supports 3a and 3b in fixed relationship to the first member 50. The balls 2 are substantially spherical identical steel balls arranged side-by-side in point contact with each other in a straight line which is parallel to the direction of relative movement between the scale 9 and the housing 10. The balls are constrained against relative movement to one another. Within the housing 10 are provided transmitting 7 and pick-up coils 6 (see FIG. 2).

As shown in FIG. 1, the scale 9 is arranged to fit within a tubular orifice provided through the housing 10. In order to avoid the ingress dirt into the housing 10, a seal 5 is provided at each end of the tubular orifice within the housing.

Figure 2:
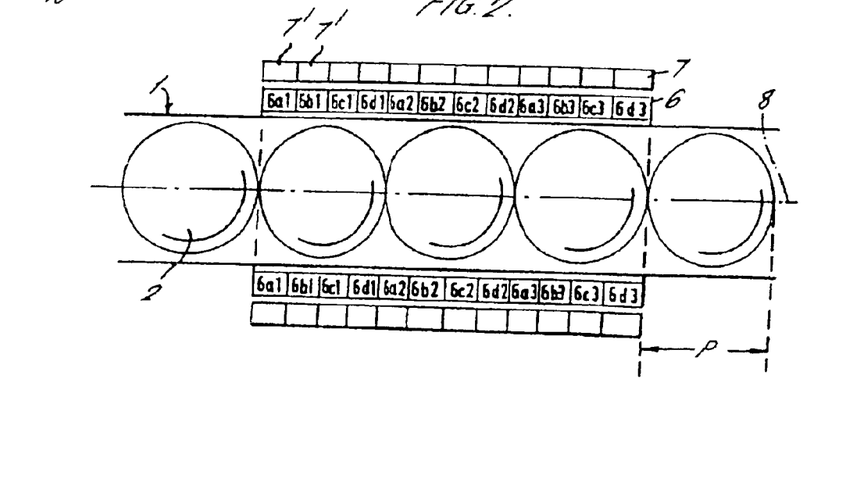
FIG. 2 is a schematic diagram of the arrangement of transmitter and pick-up coils, and magnetic balls used in an arrangement shown in FIG. 1.

FIG. 2 illustrates the arrangement of transmitting coil 7 and pick-up coils 6 within the housing 10. As shown, the transmitter coil 7 and a number of pick-up coils 6 (6a, 6b, 6c, 6d) are located around the balls 2. The transmitter coil 7 and pick-up coils 6 are co-axial with each other and also co-axial with a line 8 joining the centres of the balls. The balls 2 and the coils 6 and 7 are relatively moveable in a direction parallel to the line B.

The transmitter coil 7 comprises a number of transmitter coil portions 7', connected in series. Associated with each transmitter coil portion 7' is a pick-up coil portion, for example, 6a1, 6b1, 6c1 or 6d1. Each pick-up coil, for example 6a, comprises a number of pick-up coil portions, for example 6a1, 6a2, 6a3 which are connected in series together, and are spaced apart at intervals of length or pitch P corresponding to the diameter of the balls 2.

Figure 3:
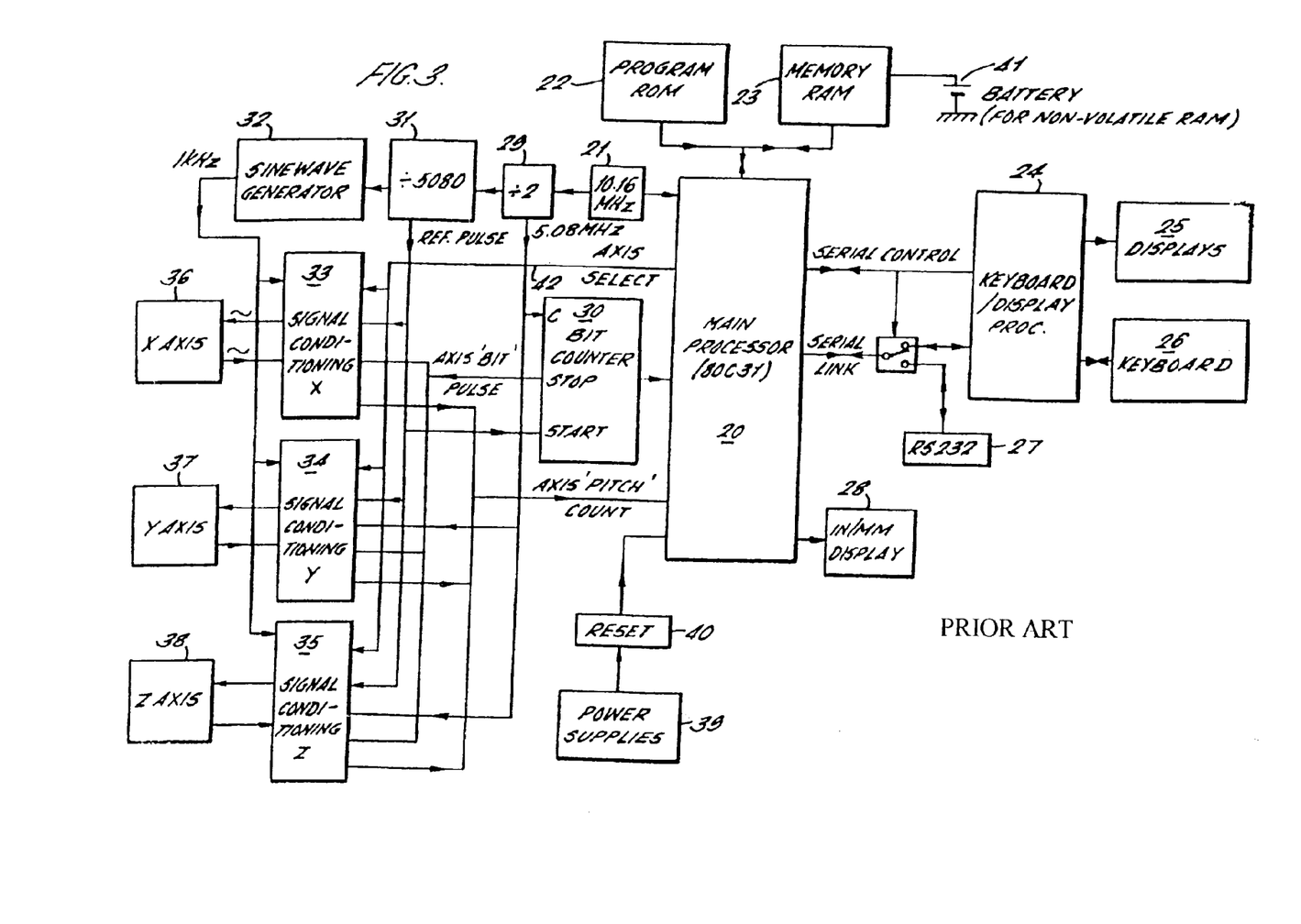
FIG. 3 is a block diagram illustrating the circuitry/apparatus used for processing the signal from three prior art detectors, one for each of the three axes X, Y, and Z.

FIG. 3 is a block diagram of the prior art electronic circuitry used in association with the detector shown in FIG. 1. The circuit includes a main processor 20 which i s typically an 80C31 processor. The main processor 20 has associated with it a non-volatile Random Access Memory (RAM) 23 with an associated battery 41 which will provide power during mains power failure. This non-volatile memory 23 holds the measured displacement data. Program Read Only Memory (ROM) 22 is also provided for the operation of the main processor 20.

A keyboard/display processor 24 is serially connected to the main processor 20 and this keyboard/display processor 24 is connected to a display 25 and keyboard 26 and controls the input and output of keyboard and display data to the main processor 20.

An RS232 port 27 is provided for connection to external equipment such as a computer and is serially connected to the main processor 20. In addition to the display 25, there is a display 28 for displaying the measured displacement in inches or millimetres.

The main processor 20 is provided with a 10.16 MHz clock signal from an oscillator 21. An output from the oscillator 21 is also output to a dividing circuit 29 which provides a 5.08 MHz clock signal to a bit counter 30 and a further divider 31. The divider 31 divides the 5.08 MHz clock signal by 5080 to provide a 1 KHz signal to a sinewave generator 32 and to three signal conditioning units 33, 34 and 35 for the X, Y and Z axes respectively (one displacement detector 36, 37, 38 being provided for each axis). The output of the sinewave generator 32 is also input into each of the signal conditioning units 33, 34, an d 35. The signal conditioning units 33, 34, and 35 are connected directly to respective detectors 36, 37, and 38.

Signals output from the detectors 36, 37, and 38 are input to respective single conditioning units 33, 34, and 35 and this signal is used to stop the bit counter 30. The start pulse for the bit counter 30 is the output of the divider 31. The output of the bit counter 30 is then input to the main processor 20.

The main processor 20 is also provided with a power supply 39 and reset facility 40. An axis select line 42 is provided connecting the main processor 20 to each signal conditioning unit 36, 37, and 38 to allow the main processor to be able to select the axis for which displacement is being measured. Thus, the arrangement can control three detectors arranged mutually perpendicularly.

The operation of the prior art circuit shown in FIG. 3 will now be described briefly. The oscillator 21 provides a 10.16 MHz clock signal which is divided to a 5.08 MHz clock signal for input to the bit counter 30. The 5.08 MHz signal is further divided by the divider 31 to provide a 1 KHz reference pulse for the signal conditioning units 33, 34, and 35 and as a start pulse for the bit counter. The 1 KHz clock signal is then used to drive a sinewave generator 32.

Each of the signal conditioning units 33, 34 and 35 outputs a 1 KHz sinusoidal signal which is applied to respective transmitter coils 7. Thus, each transmitter coil 7 is supplied with a signal which produces a magnetic field parallel to the line 8 in FIG. 2. The variation in the magnetic field resulting in relative axial movement between the balls 2 and the housing 10 produces corresponding variations in the signals induced in each of the pick-up coils 6a, 6b, 6c and 6d.

Figure 4A:
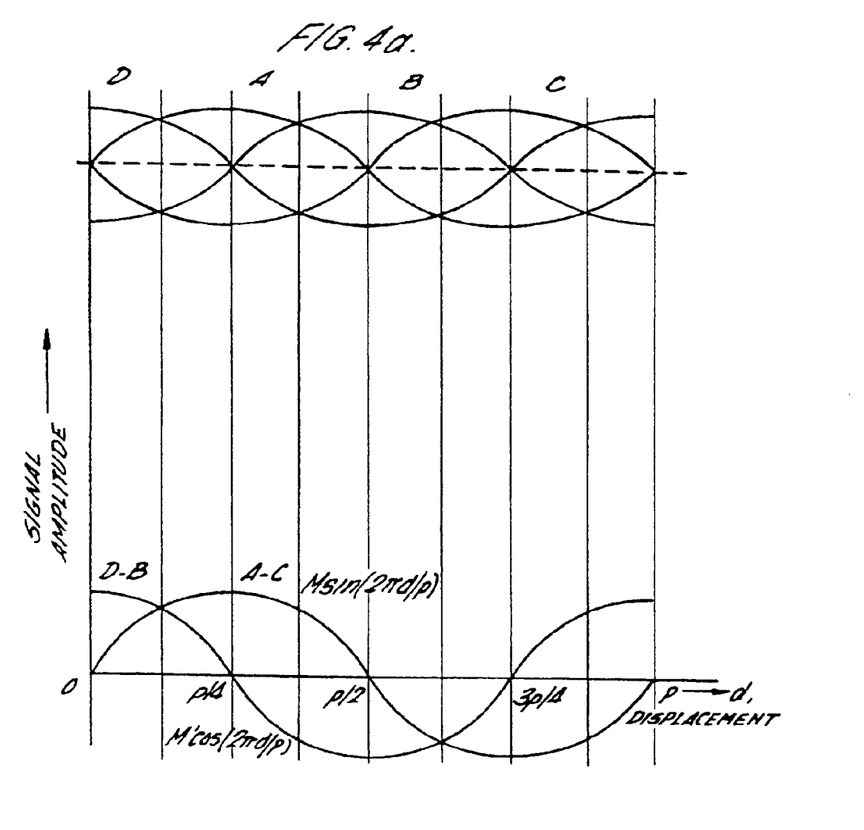
FIG. 4a illustrates how the signals received from the pick-up coils of FIG. 2 vary with position along a ball of pitch P.
Figure 4B:
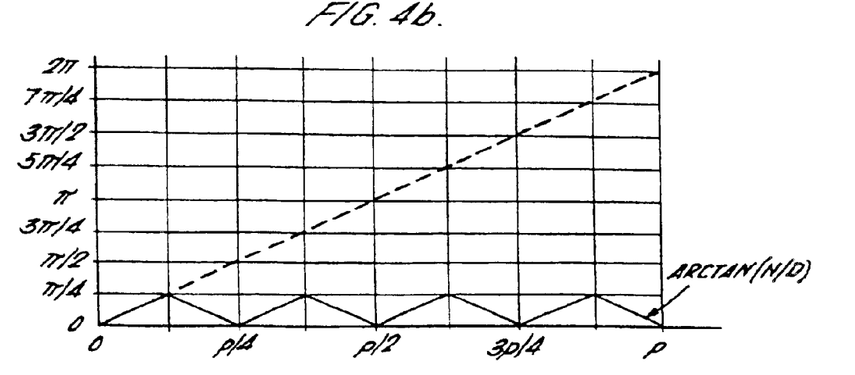
FIG. 4b illustrates how the signals received are manipulated and interpreted in the present invention.

The upper part of FIG. 4a illustrates the varying amplitude of output A, B, C, and D with position along a ball of pitch P of the signal output from the pick-up coils 6a, 6b, 6c, 6d respectively. FIG. 4b will be discussed later in relation to the present invention.

It can be seen from FIG. 4a that each of signals A, B, C, and D have amplitudes which are sinusoidally varying with displacement, the period of which is P and corresponds to the diameter of the balls 2. In addition, the sine waves A, B, C, D, do not fluctuate about the zero amplitude i.e they are offset from zero. Typically, the fluctuations are only 6% of the offset.

Each of the signals A, B, C and D are a quarter of a pitch out of phase. This is because, the pick-up coils 6a, 6b, 6c, and 6d are each spaced apart by a quarter of a ball pitch P. A signal processor (not shown) within respective detectors 36, 37, and 38 subtracts signal C from signal A and signal B from signal D to provide the periodic waveforms A–C and D–B shown in the lower part of FIG. 4a. These waveforms represent a magnitude of the 1 KHz signal frequency. This signal processor then retards the phase of the signal A–C by 45° of the 1 KHz signal and advances the phase of the D–B signal by 45° of the 1 KHz signal.

The signals A–C and D–B are then summed to provide a phase modulated signal, which is preferred for practical purposes. The resultant signal is a constant amplitude sinusoidal waveform for which the phase is directly proportional to the relative displacement due to the relative movement of the scale 9 and the housing 10 (and thus the first and second members of the machine tool). This signal is output from the detectors 36, 37 and 38 to respective signal conditioning units 33, 34, and 35.

The signal conditioning units 33, 34, and 35 output an axis bit pulse when it is determined that the phase of the resultant signal is at a pre-determined value such as 0°. The axis bit pulse is then used to stop the counter 30 which has been started by a pulse from divider 31. The signal from the divider 31 is a pulse at 1 kHz which is the input to the generator 32. Thus, the bit counter 30 provides a count value which is directly proportional to the phase difference between the 1 kHz reference signal generated by the sinewave generator and the resultant signal after phase shifting summation formed within the signal conditioning units 33, 34, and 35.

Figure 5:
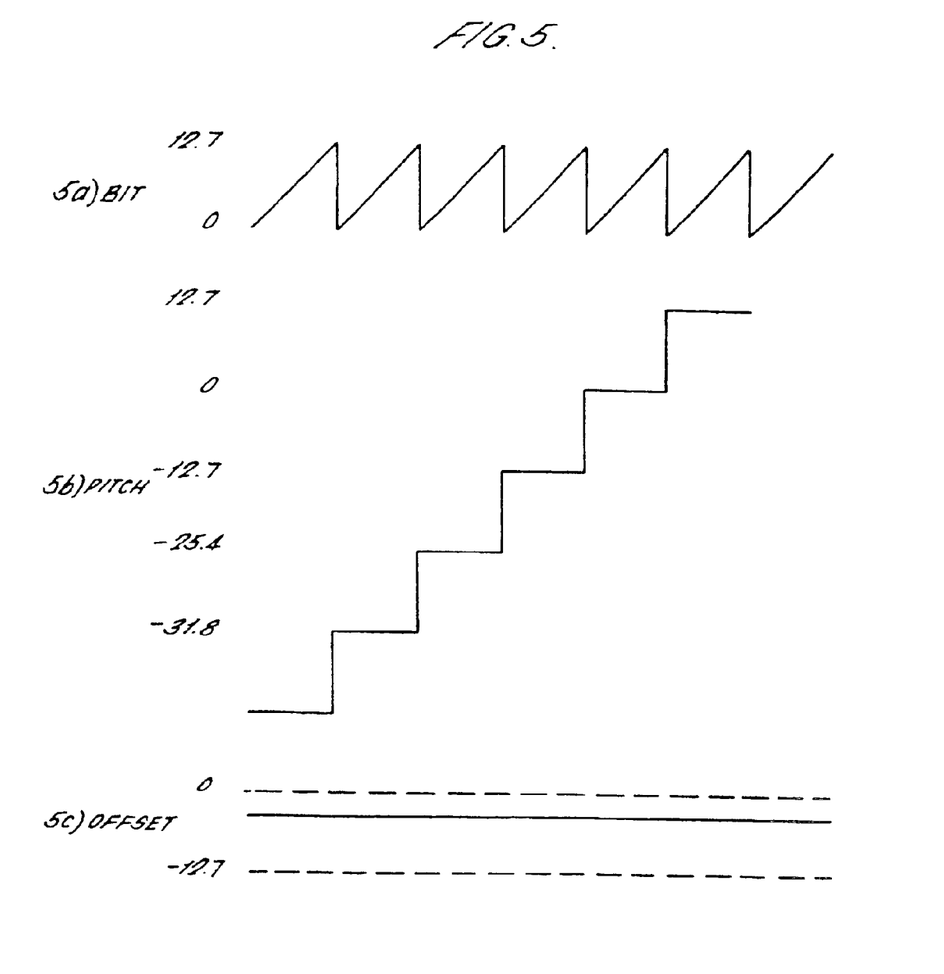
FIG. 5 illustrates how displacement is calculated in the prior art.

FIG. 5 illustrates how relative displacement is calculated by the main processor 20 in the prior art. The output of the bit counter 30 provides a bit count which can be represented by a sawtooth waveform which varies with displacement as in FIG. 5a. The bit count is a value between 0 and 5079 and represents a displacement of 0 to 12.7 mm when the balls 2 are ½ inch or 12.7 mm in diameter. Each bit therefore represents 0.0025 mm. However, since the bit count is reset to 0 after 12.7 mm of movement, the main processor 20 must count each bit count transition and this is termed a pitch count and represents 12.7 mm of relative displacement (FIG. 5b). Each 12.7 mm of displacement represents an increment in pitch count. In addition to the bit and pitch counts, there is an offset, which gives a position relative to a chosen datum, and which in this case has a value of between 0 and −12.7 (FIG. 5c). Thus, the total relative displacement between the first and second members is given by:

Rel. Disp. [mm]=(bit×0.0025)+(pitch×12.7)+offset

Thus, it is possible using this method to measure relative displacement between the scale 9 and housing 10 by counting the number of periods of the periodic waveform for the detector 1.

However, as discussed previously, these devices have limited resolution, and are incapable of is automatic calibration or self-diagnosis. In addition, these prior art position detectors generate non-standard signals which require equipment designed by the OEM to decode the signals, and thus provide the positional information.

In contrast, the current invention provides position detectors which are capable of automatic calibration and self diagnosis, have high resolution, and which also generate industry standard signals which can be decoded by commercially available equipment.

Figure 6:
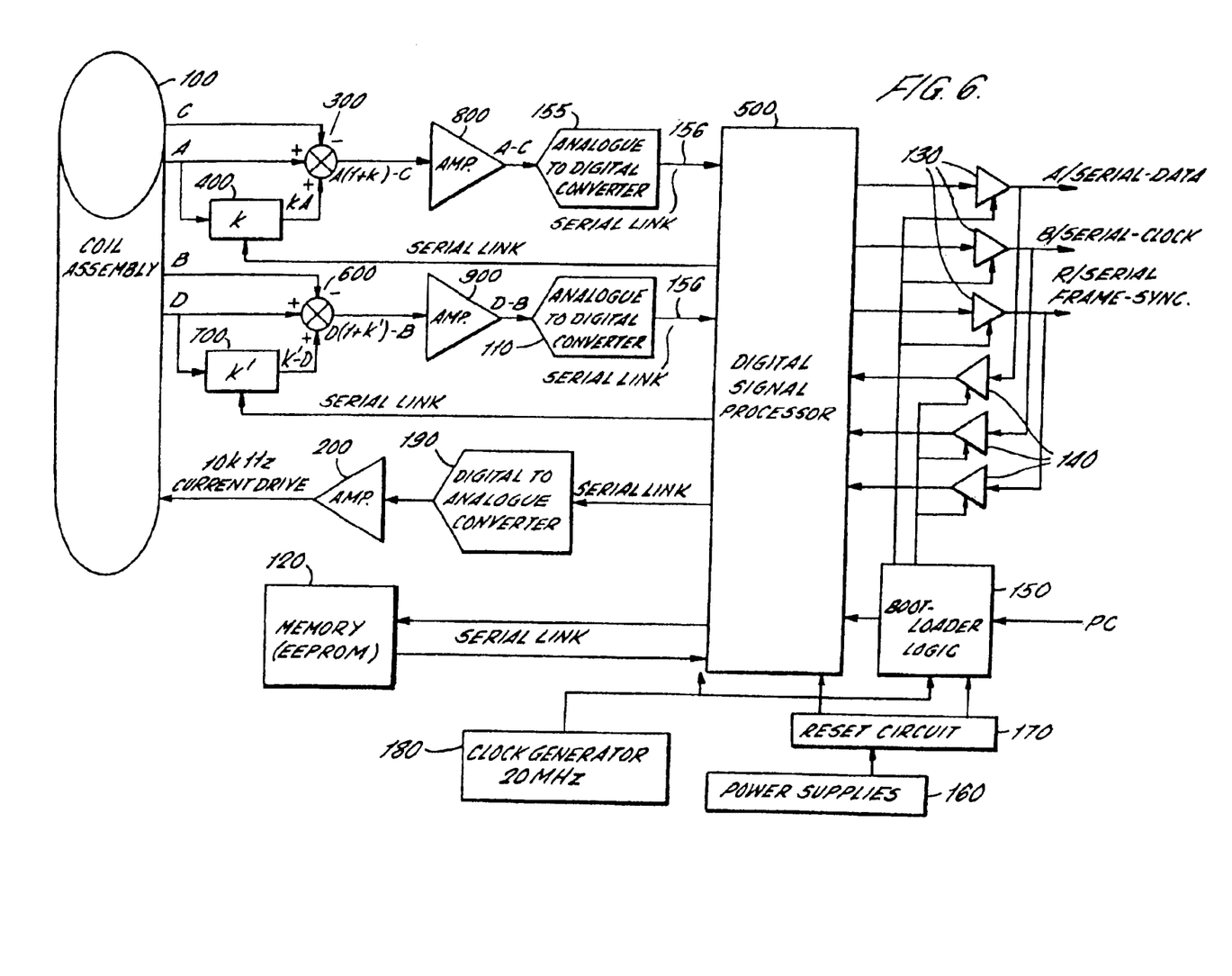
FIG. 6 is a block diagram illustrating the circuitry/apparatus used for processing the signal in the present invention.

FIG. 6 is a block diagram of the circuitry used for signal processing in the present invention. The coil assembly 100, which comprises the transmitter and pick-up coils, has been represented in a simplified form for clarity, and is as before. The circuitry is shown only for detecting displacement along a single axis of movement.

The transmitter coil (not shown), within the coil assembly 100, is driven from an amplifier 200 at 10 kHz. The signals, A, B, C, and D, are as before wherein, for example, C is subtracted from A to produce the signal A−C, and B is subtracted from D to produce D−B, as previously described and illustrated in FIG. 4a.

It is practically very difficult to produce the coil assembly 100 so that the A and C signals are exactly balanced, i.e. so that the A signal is exactly equal in amplitude to the C signal at the P/2 position. Thus, an imbalance circuit, as described below, is required. Of course, if the analogue signals are first converted to digital signals and then fed to the processor 500, the processor 500 could itself be arranged to perform the manipulation of the signals as described below, and thus replace the imbalance circuit.

To account for this imbalance, the assembly 100 is physically arranged so that the induced signal A is less than C. Then, a small proportion of A, kA, is added at the summing point 300 (FIG. 6) and thus produces the result A(1+k)−C. The fraction kA is generated using a digitally controlled potentiometer 400. This is set via a serial link from the main processor 500.

Similarly, the signals D and B are combined at the summing point 600 to produce the result D(1+k')−B. In this case, the fraction k'D is generated using a digitally controlled potentiometer 700.

These signals are amplified by amplifiers 800 and 900 and digitised by analogue-to-digital converters 155 and 110, and are then read by the processor 500 via the serial links 156. The processor 500 uses these digitised values to compute the relative position of the coil assembly 100 with respect to the balls 2.

As shown in FIG. 4a, the idealised signal A−C takes the form of a sinewave, and is defined by $M \sin(2\pi d/P)$, where d is the actual displacement of the assembly along the ball pitch P, and M represents the maximum amplitude of the signal A−C. Similarly, the idealised signal D−B takes the form, $M' \cos(2\pi d/P)$, where M' represents the maximum amplitude of the signal D−B. The ratio of the first to the second of these two signals, i.e. the ratio of (A−C)/(D−B), is M/M' tan ($2\pi d/P$). Thus, by also knowing the value of the ratio M/M', it is possible to compute the value of the displacement d, at a given time, using the arctan function and the value of the amplitude of signals A−C and D−B at the given time, using the following equation:

$$d = \frac{P}{2\pi} \arctan\left[\frac{M^1}{M}\left(\frac{A-C}{D-B}\right)\right]$$

Referring back to FIG. 4a, close to the P/4 and 3P/4 positions, the value of the D−B signal is low, tending to zero. The value of the ratio (A−C)/(D−B) is therefore very high. If the ratio (A−C)/(D−B) is greater in amplitude than one, it is more convenient to use the ratio (D−B)/(A−C). This is because the algorithm for computing the arctangent of a value in the range −1 to +1 is a simple Taylor series.

If the algebraic sign of the ratio is ignored, then the value is between zero and one, and the arctangent is in the range 0 to $+\pi/4$. This is shown FIG. 4b by the solid line which represents the result of the arctangent conversion of the ratio over the range of one ball pitch; i.e. the value of arctan (N/D), where D is the greater of (A−C) or (D−B) and N is the lesser.

By examination of the signs of the signals A−C and D−B, the quadrant, 0 to P/4, P/4 to P/2, P/2 to 3P/4, or 3P/4 to P, can be determined. For example, as shown in FIG. 4a, whereas the signals A−C and D−B are both positive in the quadrant 0 to P/4, A−C is positive and D−B is negative in the quadrant P/4 to P/2. Thus, the quadrants can be distinguished.

In addition, by examination of the relative amplitudes of the signals A−C and D−B, it is possible to determine in which half of each quadrant the pick-up coils 6 are positioned. For example, as shown in FIG. 4a, in the first half of the quadrant 0 to P/4, the amplitude of D−B is greater than A−C, this being reversed in the second half of the quadrant 0 to P/4.

This information together with the arctangent value is combined to give a unique value for the position of the coil assembly 100 (and thus the second member) in any one ball pitch. This is illustrated by the dashed line in FIG. 4b.

Samples are taken of the signals A−C and D−B at least once per cycle, at a rate of 10,000 samples a second for a 10 kHz system (compared to 1000 per second for the prior art 1 kHz system). Although samples can be taken at almost any point in the cycle, except at zero crossings, the samples are ideally taken at a peak (positive or negative) in each cycle to obtain the maximum signal. In addition, the conversion method described above is, of course, only valid if the samples for the signals A−C and D−B are taken simultaneously.

After each sample, the above conversion is performed to give a position within a ball pitch. This is compared with the previous position to determine the amount of movement, and the position change is output before the next sample is taken. It is incremental change in the position which is measured. Unlike the prior art devices, there is no equivalent to pitch count, although an offset value can also be built into the system.

For the measured incremental change in position to be correct, it is assumed that the maximum movement between conversions is less than P/2. This assumption makes it possible to determine the amount of movement without the need for having an equivalent to pitch count. For example, if the position detector registers from the first sample that the position is at 7P/8 (see FIG. 4b) and then, from the second sample, registers that the position is P/8, the only way that this change could have happened without the movement being more than by P/2 is by the position detector moving to another adjacent ball, and not back along the same ball. In most practical circumstances, this assumption is perfectly acceptable.

The rate at which the signals are converted limits the maximum speed or resolution at which the position detector can function. In the prior art, the conversion rate is dictated solely by the operational frequency and is generally once every millisecond (once per cycle). This gives, for a 12.7 mm pitch position detector, a maximum possible machine speed of 6.35 m/s (determined by (P/2)×frequency). The conversion technique of the present invention is not dictated purely by the operational frequency and can be many times a cycle, and is thus suitable for machines with speeds up to 63.5 M/s. However, the practical maximum speed may be limited by the rate at which the data can be transmitted.

Calibration of the system of the present invention, i.e. the minimising of positional errors due to non-idealised signals, can be accomplished by a combination of the following procedures. Firstly, the sample points within a (10 kHz) cycle are set to coincide with peaks in the waveforms. Secondly, the imbalances in the A to C and D to B signals are then measured and reduced using the digital potentiometers 400 and 700 as previously described. Thirdly, the difference in the maximum amplitudes M and M' of the signals A–C and D–B are measured and a correction factor applied to the conversion. Finally, the calculated position is checked against a known standard displacement.

It is possible to perform the first three procedures without reference to a standard displacement. The sample points could be repositioned if not at a peak point. The digital potentiometers are set to produce symmetrical A–C and D–B signals, i.e. with the amplitudes of the positive and negative maxima equal. The M and M' levels are the peak measured values of the A–C and D–B signals. If the system is designed to continuously monitor these signal levels then it is possible to perform corrections continually, although the time taken to do this must be considered. The aim of such corrections would be to bring the calibration, i.e. error correction, back to the conditions that existed at the time of the original calibration. By such a method, the effects of drift due to temperature, time, operational frequency or other factors may be greatly reduced.

Measured errors may be either, a) stored and continually applied to correct the calculated positions, or, b) a mathematical expression may be determined to approximate and correct for the errors.

With reference to the block diagram of FIG. 6, the program for the processor 500 is stored in non-volatile memory 120. Calibration data is also stored in this memory. The memory is Electrically-Erasable, re-Programmable, Read-Only Memory (EEPROM).

The positional data is output from the processor 500 to line drivers 130. The output data will normally take the form of quadrature A, B pulses. This is an industry standard 2-bit Gray code for the transmission of incremental positional data. Each change of state of the output lines represents a positional change of one resolution unit, e.g. 1 $\mu$m, 2 $\mu$m, 5 $\mu$m, or 10 $\mu$m. Direction is determined by the order in which the lines change. Other data formats are of course also possible.

Data may be input to the processor 500 through line receivers 140. This is necessary during the calibration procedure and to download the processor program and other information, e.g. resolution. This data is transmitted to the memory 120 for storage. The line drivers 130 and receivers 140 are never on together as they share common lines. A boot-loader logic block 150 controls whether data is input or output. When power is first applied to the transducer, an input line is interrogated by the boot-loader, logic block 150 to determine whether a programming/calibrating device, e.g. a computer, is connected. If it is, the receivers 140 are enabled and data is downloaded. If no programming/calibrating device is detected, the program in the memory 120 is loaded and run, i.e. normal operation.

The power supplies 160, power-on reset circuit 170, and clock generator 180 support the operation of the other circuits.

The processor 500 also generates digital data that describes a sinewave at the coil drive frequency, 10 kHz. This data is transmitted serially to a digital-to-analogue converter 190, which then provides the input signal to the coil drive amplifier 200.

The invention may be modified without departing from the scope of the invention. For example, the train of magnetic balls in the scale 9 could be replaced by a number of magnetic washers arranged in sequence with differing diameters. These washers may have a variety of thicknesses, and have flat or inclined edges nearest the pick-up coils. However, ball bearings have the distinct advantage that they are easy to manufacture with high dimensional tolerances and are therefore inexpensive.

In summary, the invention provides a position detector whose resolution is not solely dictated by the frequency of operation and can thus provide positional information many times per operational cycle. In addition, the invention provides a position detector which can be calibrated using a automatic process, without the intervention of a skilled operator. Furthermore, the position detector can adjust itself to take account of in-service signal fluctuations, and can also provide an indication as to when the device itself cannot perform the in service re-calibration, and thus, human intervention is required. Moreover, the position detectors generate industry standard signals which are not reliant upon equipment designed by the OEM to decode the signals, and thus provide the positional information.

What is claimed is:

1. A position detector comprising a first member, a second member, a transducer, at least one analogue to digital signal converter, and at least one digital signal processor, wherein:
   the first member carries a train of elements of magnetic material disposed side by side in a row having a central axis in contact with one another and constrained against movement relative to one another, wherein the train has a varying dimension in a direction perpendicular to the central axis;
   the first and second members are relatively movable in a direction parallel to the central axis;
   the second member carries the transducer;
   the transducer comprises transmitting and sensing means, the transmitting means arranged to produce a magnetic field through the train of elements, and the sensing means comprising at least one pick-up coil which is disposed adjacent to the train of elements, and which is arranged to detect variations in the magnetic field which are produced during relative movement between the first and second members as a result of the variation in distance between the pick-up coils and the edge of the train of elements nearest the pick-up coils, whereby the at least one pick-up coil provides an analogue signal, the amplitude of which is characteristic of the relative position of the first and second members;
   the at least one analogue to digital signal converter is arranged to receive an analogue signal derived from the at least one pick-up coil and to convert it to a digital signal;
   and the at least one digital signal processor is arranged to receive the digital signals from the at least one analogue to digital converter, and is operable, at predetermined sampling intervals, to sample the digital signals and to determine the position of the first member relative to the second member using the characteristic variation of signal amplitude with respect to the relative position of the first and second members.

2. A position detector as claimed in claim 1, wherein the dimension of the train perpendicular to the central axis varies in a repeated pattern along the train.

3. A position detector as claimed in claim 1, wherein the digital signal processor samples the signals at regular predetermined intervals.

4. A position detector as claimed in claim 1, wherein the transmitting means is arranged to produce a periodically varying magnetic field with respect to time.

5. The position detector of claim 4, wherein the digital signal processor is arranged to sample the signals from the pick-up coils substantially near their peak amplitudes with respect to time.

6. The position detector of claim 4, wherein the digital signal processor is arranged to monitor and adjust the sampling of the signals to substantially near the peak amplitudes of the signals with respect to time.

7. A method of determining the displacement of the first member relative to the second member of the position detector of claim 1, comprising sampling the digital signals and using the characteristic variation of signal amplitude with respect to the relative position of the first and second members to determine the relative position of the first and second members.

8. A position detector comprising a first member, a second member, a transducer, at least one analogue to digital signal converter, and at least one digital signal processor, wherein:

the first member carries a train of elements of magnetic material disposed side by side in a row having a central axis in contact with one another and constrained against movement relative to one another, wherein the train has a varying dimension in a direction perpendicular to the central axis;

the first and second members are relatively movable in a direction parallel to the central axis;

the second member carries the transducer;

the transducer comprises transmitting and sensing means, the transmitting means arranged to produce a magnetic field through the train of elements, and the sensing means comprising at least one pick-up coil which is disposed adjacent to the train of elements, and which is arranged to detect variations in the magnetic field which are produced during relative movement between the first and second members as a result of the variation in distance between the pick-up coils and the edge of the train of elements nearest the pick-up coils, whereby the at least one pick-up coil provides an analogue signal, the amplitude of which is characteristic of the relative position of the first and second members;

the at least one analogue to digital signal converter is arranged to receive an analogue signal derived from the at least one pick-up coil and to convert it to a digital signal;

and the at least one digital signal processor is arranged to receive the digital signals from the at least one analogue to digital converter, and is operable, at predetermined sampling intervals, to sample the digital signals and to determine the position of the first member relative to the second member using the characteristic variation of signal amplitude with respect to the relative position of the first and second members, and the digital signal processor is arranged to compare features of the variation of signal amplitude with respect to position of the signals from a first set of pick-up coils, to features of the variation of signal amplitude with respect to position from a second set of pick-up coils, and to adjust the amplitude features to produce signals from the first and second set of coils with substantially equal amplitudes features.

9. A position detector comprising a first member, a second member, a transducer, at least one analogue to digital signal converter, and at least one digital signal processor, wherein:

the first member carries a train of elements of magnetic material disposed side by side in a row having a central axis in contact with one another and constrained against movement relative to one another, wherein the train has a varying dimension in a direction perpendicular to the central axis;

the first and second members are relatively movable in a direction parallel to the central axis;

the second member carries the transducer;

the transducer comprises transmitting and sensing means, the transmitting means arranged to produce a magnetic field through the train of elements, and the sensing means comprising at least one pick-up coil which is disposed adjacent to the train of elements, and which is arranged to detect variations in the magnetic field which are produced during relative movement between the first and second members as a result of the variation in distance between the pick-up coils and the edge of the train of elements nearest the pick-up coils, whereby the at least one pick-up coil provides an analogue signal, the amplitude of which is characteristic of the relative position of the first and second members;

the at least one analogue to digital signal converter is arranged to receive an analogue signal derived from the at least one pick-up coil and to convert it to a digital signal;

and at least one digital signal processor is arranged to receive the digital signals from the at least one analogue to digital converter, and is operable, at predetermined sampling intervals, to sample the digital signals and to determine the position of the first member relative to the second member using the characteristic variation of signal amplitude with respect to the relative position of the first and second members; and the train of elements comprises a plurality of substantially spherical, identical balls of magnetic material disposed side by side in point contact, the first and second members are relatively movable in a direction parallel to the line of point contact between the balls, the sensing means comprises at least two pick-up coils which are disposed adjacent to and spaced along the train of elements, and the digital signal processor is arranged to determine the position of the first member relative to the second member by using a mathematical calculation comprising an arctangent value of a ratio of the amplitude of a sampled first digital signal from at least one pick-up coil and the amplitude of a sampled second digital signal from at least one other pick-up coil, a relative amplitude and the corresponding positions of the signals above or below an axis about which the signals fluctuate, and a constant, the constant determined from a peak amplitude of the signals with respect to position, and a ball dimension.

10. The position detector of claim 9, wherein the peak amplitude of the signals with respect to position is determined from calibration set values.

11. The position detector of claim 9, wherein the peak amplitude of the signals with respect to position used in the constant of the mathematical calculation is determined from sampling the peak amplitude of the signals with respect to position over a period of time during service.

12. The position detector of claim 9, wherein the digital signal processor is arranged to compare the amplitude of the signals with respect to position above an axis about which the signal fluctuates, to the amplitude of the corresponding signal below the axis, and to adjust the amplitudes of the signals to produce symmetrical signals with substantially equal amplitudes above and below the axis.

13. The position detector of claim 8, wherein the transducer comprises:
at least one set of four pick-up coils which are disposed adjacent to and spaced along the row of balls;
wherein the digital signal processor is arranged t o measure the imbalances in the first/third and second/fourth pair of signals, and to adjust the signals to reduce the imbalance between the respective pair of signals.

14. The position detector of claim 9, wherein the transducer comprises:
at least one set of four pick-up coils which are disposed adjacent to and spaced along the row of balls;
and at least one imbalance circuit for each pair of first/third and second/fourth pick-up coils in the set, the imbalance circuit arranged to receive the signals from the pick-up coils, and comprising a potentiometer arranged to receive and adjust analogue signals from the pick-up coils, and a subtracting circuit;
wherein the first pick-up coil of the set is arranged to receive a signal of lower amplitude than the third pick-up coil of the set, and the fourth pick-up coil of the set is arranged to receive a signal of lower amplitude than the second pick-up coil of the set,
and the potentiometer for the first/third pair of pick-up coils is operable to increase the amplitude of the first pick-up coil signal by adding a proportion of the amplitude of the first pickup coil signal, and the subtracting circuit is operable to subtract the amplitude of the third pick-up coil signal to provide the first signal used in the mathematical calculation,
and the potentiometer for the fourth/second pair o f pick-up coils is operable to increase the amplitude of the fourth pick-up coil signal by adding a proportion of the amplitude of the fourth pick-up coil signal, and the subtracting circuit is operable to subtract the amplitude of the second pick-up coil signal to provide the second signal used in the mathematical calculation.

15. A method of determining the displacement of the first member relative to the second member of the position detector of claim 9, comprising sampling the digital signals and using the characteristic variation of signal amplitude with respect to the relative position of the first and second members to determine the relative position of the first and second members.

16. The method of claim 15, comprising comparing features of the variation of signal amplitude with respect to position of the signals from a first set of pick-up coils, to features of the variation of signal amplitude with respect to position from a second set of pick-up coils, and adjusting the amplitude features to produce signals from the first and second set of coils with substantially equal amplitudes features.

17. The method of claim 15, wherein the method comprises sampling the signals from the pick-up coils of the transducer at pre-determined intervals,
calculating the arctangent value of a ratio of the amplitude of a first sampled signal from the transducer to the amplitude of a second sampled signal from the transducer,
determining the relative amplitude of each of the sampled signals and their corresponding position above or below an axis about which they fluctuate,
and performing a mathematical calculation to determine the relative displacement of the first member to the second member by using the arctangent value of the amplitude of the sampled signals, the relative amplitude and their positions about the axis, and a constant,
the constant being determined from the peak amplitude of the signals with respect to position and also a ball dimension.

18. The method of claim 17, wherein the peak amplitude of the signals with respect to position is determined from calibration set values.

19. The method of claim 17, wherein the peak amplitude of the signals with respect to position used in the constant of the mathematical calculation is determined from sampling the peak amplitude of the signals with respect to position over a period of time during service.

20. The method of claim 17, wherein the amplitude of the signals with respect to position above an axis about which the signal fluctuates, is compared to the amplitude of the corresponding signal below the axis, and adjusted to produce symmetrical signals with substantially equal amplitudes above and below the axis.

21. The method of claim 15, wherein the transmitting means is arranged to produce a periodically varying magnetic field with respect to time, and the method comprises sampling the signals from the pick-up coils substantially near their peak amplitudes with respect to time.

22. The method of claim 15, wherein sampling of signals is monitored and adjusted to sample substantially near the peak amplitudes of the signals with respect to time.

23. The method of claim 15, wherein the transducer comprises at least one set of four pick-up coils which are disposed adjacent to and spaced along the row of balls; wherein the method comprises measuring the imbalances in the first/third and second/fourth pair of signals, and sending signals to the potentiometers to reduce the imbalance between the respective pair of signals.

24. The method of claim 15, wherein the imbalance in the sampled signals is reduced, by providing the transducer with
at least one set of four pick-up coils which are disposed adjacent to and spaced along the row of balls;
and at least one imbalance circuit for each pair of first/third and second/fourth pick-up coils in the set, the imbalance circuit arranged to receive the signals from the pick-up coils, and comprising a potentiometer arranged to receive and adjust analogue signals from the pick-up coils, and a subtracting circuit;
and comprising the steps of arranging the first pick-up coil of the set to receive a signal of lower amplitude than the third pick-up coil of the set, and arranging the fourth pick-up coil of the set to receive a signal of lower amplitude than the second pick-up coil of the set,
increasing the amplitude of the first pick-up coil signal by using the first/third pair potentiometer to add a proportion of the amplitude of the first pick-up coil signal, and using the subtracting circuit to subtract the amplitude of the third pick-up coil signal from the increased first pick-up signal, to provide the first signal used in the mathematical calculation, and increasing the amplitude of the fourth pick-up coil signal by using the fourth/second pair potentiometer to add a proportion of the amplitude of the fourth pick-up coil signal, and using the subtracting circuit to subtract the amplitude of the second pick-up coil signal from the increased fourth pick-up signal, to provide the second signal used in the mathematical calculation.

25. A method of determining a displacement of a first member relative to a second member of a position detector comprising:

the first member, the second member, a transducer, at least one analogue to digital signal converter, and at least one digital signal processor, wherein:

the first member carries a train of elements of magnetic material disposed side by side in a row having a central axis in contact with one another and constrained against movement relative to one another, wherein the train has a varying dimension in a direction perpendicular to the central axis;

the first and second members are relatively movable in a direction parallel to the central axis;

the second member carries the transducer;

the transducer comprises transmitting and sensing means, the transmitting means arranged to produce a magnetic field through the train of elements, and the sensing means comprising at least one pick-up coil which is disposed adjacent to the train of elements, and which is arranged to detect variations in the magnetic field which are produced during relative movement between the first and second members as a result of the variation in distance between the pick-up coils and the edge of the train of elements nearest the pick-up coils, whereby the at least one pick-up coil provides an analogue signal, the amplitude of which is characteristic of the relative position of the first and second members;

the at least one analogue to digital signal converter is arranged to receive an analogue signal derived from the at least one pick-up coil and to convert it to a digital signal; and the at least one digital signal processor is arranged to receive the digital signals from the at least one analogue to digital converter, and is operable, at predetermined sampling intervals, to sample the digital signals and to determine the position of the first member relative to the second member using the characteristic variation of signal amplitude with respect to the relative position of the first and second members;

the method comprising:

sampling the digital signals and using the characteristic variation of signal amplitude with respect to the relative position of the first and second members to determine the relative position of the first and second members; and comparing features of the variation of signal amplitude with respect to position of the signals from a first set of pick-up coils, to features of the variation of signal amplitude with respect to position from a second set of pick-up coils, and adjusting the amplitude features to produce signals from the first and second set of coils with substantially equal amplitudes features.

26. A method of determining a displacement of a first member relative to a second member of a position detector comprising:

the first member, the second member, a transducer, at least one analogue to digital signal converter, and at least one digital signal processor, wherein:

the first member carries a train of elements of magnetic material disposed side by side in a row having a central axis in contact with one another and constrained against movement relative to one another, wherein the train has a varying dimension in a direction perpendicular to the central axis;

the first and second members are relatively movable in a direction parallel to the central axis;

the second member carries the transducer;

the transducer comprises transmitting and sensing means, the transmitting means arranged to produce a magnetic field through the train of elements, and the sensing means comprising at least one pick-up coil which is disposed adjacent to the train of elements, and which is arranged to detect variations in the magnetic field which are produced during relative movement between the first and second members as a result of the variation in distance between the pick-up coils and the edge of the train of elements nearest the pick-up coils, whereby the at least one pick-up coil provides an analogue signal, the amplitude of which is characteristic of the relative position of the first and second members;

the at least one analogue to digital signal converter is arranged to receive an analogue signal derived from the at least one pick-up coil and to convert it to a digital signal;

and the at least one digital signal processor is arranged to receive the digital signals from the at least one analogue to digital converter, and is operable, at predetermined sampling intervals, to sample the digital signals and to determine the position of the first member relative to the second member using the characteristic variation of signal amplitude with respect to the relative position of the first and second members;

the method comprising:

sampling the digital signals and using the characteristic variation of signal amplitude with respect to the relative position of the first and second members to determine the relative position of the first and second members, wherein the transmitting means is arranged to produce a periodically varying magnetic field with respect to time, and the method comprises sampling the signals from the pick-up coils substantially near their peak amplitudes with respect to time.

27. A method of determining a displacement of a first member relative to a second member of a position detector comprising:

the first member, the second member, a transducer, at least one analogue to digital signal converter, and at least one digital signal processor, wherein:

the first member carries a train of elements of magnetic material disposed side by side in a row having a central axis in contact with one another and constrained against movement relative to one another, wherein the train has a varying dimension in a direction perpendicular to the central axis;

the firs t and second members are relatively movable in a direction parallel to the central axis;

the second member carries the transducer;

the transducer comprises transmitting and sensing means, the totting means arranged to produce a magnetic field through the train of elements, and the sensing means comprising at least one pick-up coil which is disposed adjacent to the train of elements, and which is arranged to detect variations in the magnetic field which are produced during relative movement between the first and second members as a result of the variation in distance between the pick-up coils and the edge of the train of elements nearest the pick-up coils, whereby the at least one pick-up coil provides an analogue signal, the amplitude of which is characteristic of the relative position of the first and second members;

the at least one analogue to digital signal converter is arranged to receive an analogue signal derived from the at least one pick-up coil and to convert it to a digital signal, and the at least one digital signal processor is arranged to receive the digital signals from the at least one analogue to digital converter, and is operable, at predetermined sampling intervals, to sample the digital signals and to determine the position of the first member relative to the second member using the characteristic variation of signal amplitude with respect to the relative position of the first and second members;

the method comprising:

sampling the digital signals and using the characteristic variation of signal amplitude with respect to the relative position of the first and second members to determine the relative position of the first and second members, wherein sampling of signals is monitored and adjusted to sample substantially near the peak amplitudes of the signals with respect to time.

28. A method of determining a displacement of a first member relative to a second member of a position detector comprising:

the first member, the second member, a transducer, at least one analogue to digital signal converter, and at least one digital signal processor, wherein:

the first member carries a train of elements of magnetic material disposed side by side in a row having a central axis in contact with one another and constrained against movement relative to one another, wherein the train has a varying dimension in a direction perpendicular to the central axis;

the first and second members are relatively movable in a direction parallel to the central axis;

the second member carries the transducer, the transducer comprises transmitting and sensing means, the transmitting means arranged to produce a magnetic field through the train of elements, and the sensing means comprising at least one pick-up coil which is disposed adjacent to the train of elements, and which is arranged to detect variations in the magnetic field which are produced during relative movement between the first and second members as a result of the variation in distance between the pick-up coils and the edge of the train of elements nearest the pick-up coils, whereby the at least one pick-up coil provides an analogue signal, the amplitude of which is characteristic of the relative position of the first and second members;

the at least one analogue to digital signal converter is arranged to receive an analogue signal derived from the at least one pick-up coil and to convert it to a digital signal;

and the at least one digital signal processor is arranged to receive the digital signals from the at least one analogue to digital converter, and is operable, at predetermined sampling intervals, to sample the digital signals and to determine the position of the first member relative to the second member using the characteristic variation of signal amplitude with respect to the relative position of the first and second members;

the method comprising:

sampling the digital signals and using the characteristic variation of signal amplitude with respect to the relative position of the first and second members to determine the relative position of the first and second members, wherein the transducer comprises at least one set of four pick-up coils which are disposed adjacent to and spaced along the row of balls; wherein the method comprises measuring the imbalances in the first/third and second/fourth pair of signals, and sending signals to the potentiometers to reduce the imbalance between the respective pair of signals.

\* \* \* \* \*